Patented Mar. 23, 1948

2,438,177

UNITED STATES PATENT OFFICE 2,438,177

C - p - AMINOBENZENESULFONAMIDO - SUBSTITUTED THIAZOLINES AND METHOD FOR THEIR PRODUCTION

William A. Lott, East Orange, and Frank H. Bergeim, Highland Park, N. J., assignors to E. R. Squibb & Sons, New York, N. Y., a corporation of New York No Drawing. Application March 18, 1939, Serial No. 262,729

4 Claims. (Cl. 260—239.6)

This invention relates to, and has for its object the provision of, C-amino-benzene-sulfonamido-substituted N,S-heterocyclic compounds and salts thereof, and a method of preparing these compounds.

The C-amino-benzene-sulfonamido-substituted N,S-hetero-cyclic compounds are compounds having a heterocyclic ring embodying both an N and an S atom, and having substituted on a nuclear C-atom thereof an amino-benzene-sulfonamido residue (including, of course, substituted amino-benzene-sulfonamido residues). The invention comprises especially compounds of the general formula

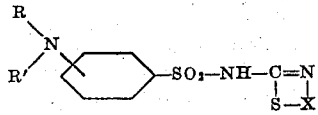

wherein R represents hydrogen or lower alkyl, R' represents hydrogen, lower alkyl, or acyl, and X represents a carbon chain completing an N,S-heterocyclic residue, preferably a thiazole residue; these compounds (especially those embodying the

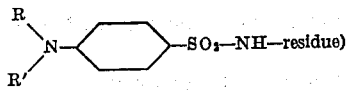

are valuable chemotherapeutic agents, being effective in the treatment of certain infectious diseases.

The N,S-heterocyclic residues in the compounds of this invention may be derived from thiazoles, isothiazoles, thiazines, thiazanes, thiazoline, thiazolidines, etc. The compounds obtained are amphoteric and readily form acid-addition salts soluble in water, with hydrochloric, sulfuric, boric, nitric, lactic, tartaric, and other acids commonly used to solubilize amine-bases, as well as salts with bases, for example NaOH, KOH, or organic bases.

The C-amino-benzene-sulfonamido-substituted N,S-heterocyclic compounds are prepared by reacting a p-amino-benzene-sulfonyl halide (the amino group thereof being protected, e. g. acetylated with a C-amino-substituted N,S-heterocyclic compound in a suitable inert solvent, such as benzene, preferably in a pyridine-type reaction-medium (e. g. pyridine, quinoline, or dimethylaniline). For example, a 2-(p-amino-benzene-sulfonamido)-thiazole may be prepared by reacting p - acetylamino - benzene - sulfonyl chloride with 2-amino-thiazole in a pyridine reaction medium; the resulting 2-(p-acetamino-benzene-sulfonamido)-thiazole is separated by diluting the reaction medium with water, and may, if desired, be converted into the corresponding unacylated compound by hydrolysis, for example with hydrochloric acid.

The following examples are illustrative of the invention:

EXAMPLE 1

10 g. of 2-amino thiazole is dissolved (and partly suspended) in about 15 cc. of pyridine, and to this solution is added a solution (or part solution) obtained by treating 20 cc. of pyridine with 21.2 g. p-acetamino-benzene-sulfonyl chloride, the temperature during the mixing being preferably held at 10–25° C. by means of external cooling. The solution thus obtained is allowed to stand several hours, and then diluted with four to five times its volume of water; the dilution causes a separation of crude 2-(p-acetamino-benzene-sulfonyl-amino)-thiazole in the form of a crystalline powder, which, without further purification, melts at 244–246° C. (uncorr.).

To prepare the unacetylated compound, the acetyl group is removed by hydrolysis; one part by weight of the crude acetyl derivative is treated with five parts by weight of 10% hydrochloric acid, and refluxed until all the solid is dissolved. The solution is then cooled to room temperature, and sufficient 10% sodium hydroxide added to just neutralize the HCl present. During this neutralization, a gummy product separates out and soon crystallizes. This crude product is first purified by dissolving in dilute alkali, filtering, and reprecipitating by adding just sufficient dilute acid to neutralize the original alkali used. The crystalline powder thus obtained is finally purified by recrystallization from alcohol, and melts at 197–8° C. (uncorr.); analysis shows it to be pure 2 - (p - amino-benzene-sulfonamido)-thiazole.

The compound may be converted into a water-soluble acid-addition salt, for example the hydrochloride, by dissolving it in absolute alcohol, adding one mole of dry hydrochloric acid, and precipitating the salt by adding ether (or by evaporating the alcoholic solution to dryness). An aqueous solution of the salt may be prepared without isolating the salt, by adding the 2-(p-amino-benzene-sulfonamido)-thiazole to a dilute aqueous solution of hydrochloric acid.

The sodium salt of the compound 2-(p-amino-benzene-sulfonamide)-thiazole may be prepared by suspending one part of the compound in twenty parts by weight of boiling alcohol, and adding thereto a moderate excess over one mole of alcoholic sodium hydroxide. After cooling, adding ether to the point of incipient precipitation, and being allowed to stand overnight in the refrigerator, the sodium salt separates as well-formed large plates. The salt is readily soluble in water, and melts at 262–263° C. (uncorr.).

EXAMPLE 2

11.4 g. of 2-amino-4-methyl-thiazole is dissolved in about 15 cc. of pyridine and reacted with 21.2 g. of p-acetamino-benzene-sulfonyl chloride in the manner detailed in Example 1. There is thus obtained 2-(p-acetamino-benzene-sulfonamido)-4-methyl-thiazole, and by hydrolysis thereof 2-(p-amino-benzene-sulfonamido)-4-methyl-thiazole; and the latter may be converted into an acid-addition salt, for example the hydrochloride, or into a salt with a base (e. g. KOH), as detailed in Example 1.

EXAMPLE 3

2-amino-4-ethyl-thiazole is prepared by reacting 1-chloro-2-butanone with thiourea in the manner described for the preparation of 2-aminothiazole in J. Am. Pharm. Assoc. 23 786 (1934) and Ber. 21 938 (1888). The 2-amino-4-ethyl-thiazole is then converted into 2-(p-acetamino-benzene-sulfonamido)-4-ethyl-thiazole and into the unacetylated compound and salts thereof in the same manner as 2-amino-4-methyl-thiazole (Example 2).

A large number and variety of other C-amino-benzene-sulfonamido-substituted N,S-heterocyclic compounds may be similarly prepared by interacting the appropriate p-amino-benzene-sulfonyl halide (A) (having its amino group protected) with the appropriate C-amino-substituted N,S-heterocyclic compound (B), the following being further examples of compounds embraced by the invention and of additional reactants A and B.

EXAMPLE 4

2 - (p - acetamino - benzene - sulfonamido) -4- phenyl thiazole.

EXAMPLE 5

2 - (p - acetamino - benzene - sulfonamido) -4- (3,4-dihydroxy-phenyl) -thiazole.

EXAMPLE 6

2 - (p - acetamino - benzene - sulfonamido) -4- ($\beta$-chlorethyl) -thiazole.

EXAMPLE 7

2 - (p - acetamino - benzene - sulfonamido) -4- carboxy-thiazole.

EXAMPLE 8

2-(p-amino-benzene-sulfonamido) - 4 - phenyl-thiazole.

EXAMPLE 9

2-(p-amino-benzene-sulfonamido) -4 - (3,4 - dihydroxy-phenyl) -thiazole.

EXAMPLE 10

2-(p-amino-benzene-sulfonamido) -4- ($\beta$-chlor-oethyl) -thiazole.

EXAMPLE 11

2 -(p-amino-benzene-sulfonamido) -4-carboxy-thiazole.

EXAMPLE 12

2-(p-amino-benzene - sulfonamido) -$\Delta^2$-thiazoline.

EXAMPLE 13

2-(p-amino-benzene-sulfonamido) - 4 - methyl-$\Delta^2$-thiazoline.

EXAMPLE 14

2 - (p-acetamino - benzene - sulfonamido) - 4 - methyl-5-hydroxyethyl-thiazole.

EXAMPLE 15

2-(p-amino-benzene-sulfonamido) - 4 - methyl-5-hydroxyethyl-thiazole.

EXAMPLE 16

2-(m-amino-benzene-sulfonamido) -thiazole.

EXAMPLE 17

2-(o-amino-benzene-sulfonamido) -thiazole.

*Additional reactants A* p-methylamino-benzene-sulfonyl-chloride
p-diethylamino-benzene-sulfonyl-chloride
p-acetamino-benzene-sulfonyl-bromide

*Additional reactants B*

2-amino-5,5-dimethyl-$\Delta^2$-thiazoline
2-amino-4-methyl-5-carboxy-thiazole

The invention may be variously otherwise embodied—for example, temperatures up to about 100° C. may be used in the reaction, and the proportions of pyridine-type reaction-medium may be considerably varied—within the scope of the appended claims.

We claim:
1. C-p-amino-benzene-sulfonamido-substituted thiazolines.
2. 2 -(p-amino-benzene - sulfonamido) -$\Delta^2$-thiazoline.
3. 2 - (p - amino - benzene - sulfonamido) - 4 - methyl-$\Delta^2$-thiazoline.
4. The method of preparing C-p-amino-benzene-sulfonamido-substituted thiazolines which comprises reacting a p-amino-benzene-sulfonyl halide, the amino group thereof being protected, with a C-amino-substituted thiazoline in a suitable inert solvent.

WILLIAM A. LOTT.
FRANK H. BERGEIM.

REFERENCES CITED

The following references are of record in the file of this patent:

UNITED STATES PATENTS

| Number | Name | Date |
|---|---|---|
| 1,898,431 | Dressel | Feb. 21, 1933 |
| 2,097,414 | Kharasch et al. | Oct. 26, 1937 |
| 2,132,178 | Mietsch et al. | Oct. 4, 1938 |
| 2,259,222 | Ewins | Oct. 14, 1941 |

FOREIGN PATENTS

| Number | Country | Date |
|---|---|---|
| 482,576 | Great Britain | Mar. 28, 1938 |
| 486,449 | Great Britain | June 2, 1938 |

OTHER REFERENCES

Norris, "Organic Chemistry," 3d ed. (McGraw-Hill, 1931); pp. 490, 491, 495.
Gray et al., Biochem. Journ., vol. 35, pp. 724–730 (1937).
Whitby, Lancet, May 28, 1938, pp. 1210–1212.
Gelmo, Journal fur praktische Chemie (2), vol. 77, pp. 369–382 (1908).
Chem. Abstracts, vol. 32, pp. 5800 to 5801 (1938) [Citing: Journ. Applied Chem. (U. S. S. R.), vol. 11, pp. 316-17].
Chem. Abstracts, vol. 32, pp. 4150–4151 (1938) [Citing: J. Indian Chem. Soc., vol. 14, pp. 733–735 (1937)].